US011969750B2

United States Patent
(12) United States Patent
Tanaka et al.

(10) Patent No.: US 11,969,750 B2
(45) Date of Patent: Apr. 30, 2024

(54) PAINTING METHOD AND PAINTING APPARATUS FOR INSULATOR

(71) Applicant: TOYOTA JIDOSHA KABUSHIKI KAISHA, Toyota (JP)

(72) Inventors: Kazuki Tanaka, Toyota (JP); Shinji Tani, Toyota (JP); Tsuyoshi Yamaguchi, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 17/846,551

(22) Filed: Jun. 22, 2022

(65) Prior Publication Data

US 2023/0025587 A1 Jan. 26, 2023

(30) Foreign Application Priority Data

Jul. 21, 2021 (JP) ................................ 2021-120190

(51) Int. Cl.

| | |
|---|---|
| ***B29C 64/393*** | (2017.01) |
| ***B05B 5/00*** | (2006.01) |
| ***B05B 5/08*** | (2006.01) |
| ***B05D 1/04*** | (2006.01) |
| ***B29C 64/295*** | (2017.01) |
| ***B33Y 10/00*** | (2015.01) |
| ***B33Y 30/00*** | (2015.01) |
| ***B33Y 50/02*** | (2015.01) |
| ***G05B 19/4155*** | (2006.01) |

(52) U.S. Cl.

CPC .............. *B05D 1/045* (2013.01); *B05B 5/004* (2013.01); *B05B 5/082* (2013.01); *B05D 2201/02* (2013.01)

(58) Field of Classification Search

CPC ................ B05D 1/045; B05D 2201/02; B05D 2201/00; B05B 5/004; B05B 5/082; B05B 5/087

See application file for complete search history.

(56) References Cited

U.S. PATENT DOCUMENTS

| | | | | |
|---|---|---|---|---|
| 5,156,880 A | 10/1992 | Inculet | | |
| 5,262,207 A | 11/1993 | Garner et al. | | |
| 2006/0267156 A1* | 11/2006 | Meagley | ................ | C23C 26/00 257/632 |
| 2017/0095834 A1* | 4/2017 | Kinard | .................... | A01M 7/00 |

FOREIGN PATENT DOCUMENTS

| | | | | |
|---|---|---|---|---|
| JP | 60-031550 B2 | 7/1985 | | |
| JP | 05-192631 A | 8/1993 | | |
| JP | 10-076218 A | 3/1998 | | |
| JP | 2013071108 A * | 4/2013 | ............ | B05B 5/087 |
| JP | 5838697 B2 | 1/2016 | | |
| JP | 2017-136550 A | 8/2017 | | |
| WO | WO-9737770 A1 * | 10/1997 | ............ | B05B 5/087 |

* cited by examiner

*Primary Examiner* — Alexander M Weddle

(74) *Attorney, Agent, or Firm* — Oblon, McClelland, Maier & Neustadt, L.L.P.

(57) ABSTRACT

A painting target surface of a resin bumper is painted by discharging a paint mist from a spray gun toward the painting target surface with a charged conductor arranged in contact with an opposite side to the painting target surface. The paint mist is uncharged or is charged with electric charges having an opposite polarity to that of the conductor and at a potential having a lower absolute value than that of the conductor.

7 Claims, 5 Drawing Sheets

PAINTING METHOD AND PAINTING APPARATUS FOR INSULATOR

CROSS-REFERENCE TO RELATED APPLICATION

This application claims priority to Japanese Patent Application No. 2021-120190 filed on Jul. 21, 2021, incorporated herein by reference in its entirety.

BACKGROUND

1. Technical Field

The present disclosure relates to a painting method and a painting apparatus for an insulator.

2. Description of Related Art

Resin molded products such as resin bumpers for automobiles are so-called insulators (non-conductors) having a high surface electrical resistance value. When painting the surface (painting target surface) of this type of insulator, electrostatic painting may be performed to increase the paint adhesion efficiency. In this case, the insulator is coated with a conductive material into a conductor. While grounding the insulator converted into the conductor, a charged paint mist is discharged toward the painting target surface of the insulator. When the insulator is coated with the conductive material in this way, a special material or a special step is required. Therefore, for example, the cost for painting the painting target surface increases.

For example, Japanese Unexamined Patent Application Publication No. 10-76218 (JP 10-76218 A) discloses a technology for charging a painting target surface without requiring a step of coating an insulator with a conductive material. In the disclosure of JP 10-76218 A, a negative voltage is applied to a paint (the paint is negatively charged) to perform electrostatic painting on the painting target surface of the insulator. Prior to the electrostatic painting, the painting target surface of the insulator is positively charged. Specifically, a positive electrode of a high voltage generator is caused to face the painting target surface, and a positive voltage is applied to the positive electrode to cause corona discharge, thereby ionizing air positively. The painting target surface is positively charged by this positively ionized air.

SUMMARY

In the technology disclosed in JP 10-76218 A, the painting target surface of the insulator is directly charged by the high voltage generator. Therefore, the distribution of electric charges on the painting target surface may vary. Thus, it is difficult to bring the painting target surface into a desired charged state. For example, it is difficult to uniformly charge a desired region of the painting target surface or uniformly charge the entire painting target surface. In these cases, it is difficult to obtain a desired painting state by the electrostatic painting. There is a limit to the increase in the painting quality.

As disclosed in JP 10-76218 A, the electrostatic painting of the insulator is performed by charging (negatively charging) the paint mist with a relatively high voltage. Therefore, the electric charges of the paint mist applied to the painting target surface are likely to remain on the insulator. When the electric charges remain on the insulator, electric charges of a paint mist subsequently discharged toward the painting target surface electrically repel the electric charges on the insulator. Therefore, it may be difficult to obtain a paint film having a sufficient film thickness. This is also one of the factors in the limit to the increase in the painting quality.

The present disclosure provides a painting method and a painting apparatus for an insulator that are capable of increasing the painting quality when painting the painting target surface of the insulator.

A painting method for an insulator according to the present disclosure includes painting a painting target surface of the insulator by discharging, toward the painting target surface of the insulator with a charged conductor arranged in contact with or proximity to an opposite side to the painting target surface of the insulator, a paint mist that is uncharged or is charged with electric charges having an opposite polarity to a polarity of electric charges of the conductor and at a potential having a lower absolute value than an absolute value of a potential of the conductor.

In the painting of the painting target surface of the insulator, the charged conductor is in contact with or proximity to the insulator. Therefore, the paint mist discharged toward the painting target surface of the insulator is attracted to the painting target surface. As a result, the painting target surface is painted. In the structure in which the insulator is charged by bringing the charged conductor into contact with or proximity to the insulator, the variation in the distribution of electric charges on the painting target surface of the insulator can be reduced as compared with, for example, a case where the painting target surface is directly charged. As a result, the painting target surface can be brought into a desired charged state. For example, it is possible to uniformly charge a desired region of the painting target surface or uniformly charge the entire painting target surface. The charged state of the painting target surface greatly affects the finish of painting in the electrostatic painting. Therefore, high painting quality can be obtained by bringing the painting target surface into the desired charged state. The paint mist is uncharged or is charged with the electric charges having the opposite polarity to the polarity of the electric charges of the conductor and at the potential having the lower absolute value than the absolute value of the potential of the conductor. Therefore, it is possible to suppress electrical repellence between particles of the paint mist due to the electric charges of the paint mist remaining on the insulator. As a result, it is possible to obtain a paint film having a sufficient film thickness. It is also possible to obtain high painting quality.

In the painting method according to the present disclosure, the painting the painting target surface of the insulator may include performing energization for charging the conductor.

In the painting method according to the present disclosure, the painting the painting target surface of the insulator may be performed in a state in which a discharge apparatus configured to discharge the paint mist is grounded.

In this case, the painting target surface of the insulator is painted by using the uncharged paint mist. According to this case, it is not necessary to control energization for charging the discharge apparatus. That is, it is sufficient to control the energization of the conductor to charge the insulator. Therefore, high painting quality can be obtained by bringing the painting target surface of the insulator into the desired charged state with relatively simple control.

In the painting method according to the present disclosure, the painting the painting target surface of the insulator may be performed in a state in which a discharge apparatus configured to discharge the paint mist is charged with the electric charges having the opposite polarity to the polarity of the electric charges of the conductor and at the potential having the lower absolute value than the absolute value of the potential of the conductor.

In this case, the painting target surface of the insulator is painted by using the paint mist charged with the electric charges having the opposite polarity to the polarity of the electric charges of the conductor and at the potential having the lower absolute value than the absolute value of the potential of the conductor. According to this case, the potential difference between the insulator charged by the conductor and the paint mist discharged from the discharge apparatus can be increased as compared with, for example, the case of using the uncharged paint mist. Therefore, the force for attracting the paint mist to the painting target surface (attractive force between the paint mist and the painting target surface) can be increased. As a result, the paint mist can effectively be applied to the painting target surface of the insulator. Furthermore, the paint that is not applied to the painting target surface of the insulator (overspray mist) can be reduced, thereby reducing a wasteful paint.

The painting method according to the present disclosure may include neutralizing the conductor and the insulator by stopping the energization of the conductor and grounding the conductor after finishing the painting the painting target surface of the insulator.

In the case of performing the neutralization by grounding the conductor, the conductor and the insulator can be neutralized quickly and reliably as compared with, for example, a case of performing the neutralization by grounding the charged insulator. Therefore, it is possible to shorten a tact time of the steps for painting the painting target surface of the insulator, including painting the painting target surface of the insulator and neutralizing the conductor and the insulator. As a result, it is possible to realize an efficient painting method for the insulator.

In the painting method according to the present disclosure, a ground path for grounding the conductor may include a space enclosed by a non-conductive member, and in the neutralizing the conductor and the insulator, an air pressure in the space may be reduced to cause vacuum discharge in the space.

Accordingly, the electrical resistance of the ground path can be adjusted by adjusting the air pressure in the space enclosed by the non-conductive member. Thus, it is possible to adjust a timing to cause the vacuum discharge. As a result, it is possible to easily adjust a timing to neutralize the conductor and the insulator.

The painting method according to the present disclosure may include neutralizing the conductor and the insulator by stopping the energization of the conductor after finishing the painting the painting target surface of the insulator. In this case, the neutralization of the conductor and insulator does not require the switching of the conductor to the grounded state.

Since the special step for neutralizing the conductor and the insulator is not required, the painting method can be simplified by reducing the number of steps.

In the painting method according to the present disclosure, the painting the painting target surface of the insulator may be performed in a state in which the conductor is supported by a non-conductive support member.

In this case, the conductor is not grounded (is insulated) in the painting of the painting target surface of the insulator. Therefore, the painting target surface of the insulator can be painted with the electric charges of the conductor maintained at a high level. That is, it is possible to maintain a large potential difference between the insulator and the paint mist. As a result, the force for attracting the paint mist to the painting target surface can be increased, thereby reducing a wasteful paint.

A painting apparatus for carrying out the painting method described above is also within the scope of the present disclosure. A painting apparatus for an insulator according to the present disclosure includes a conductor configured to come into contact with or proximity to a surface opposite to a painting target surface of the insulator, a charging unit configured to charge the conductor, and a discharge apparatus configured to discharge, toward the painting target surface of the insulator, a paint mist that is uncharged or is charged with electric charges having an opposite polarity to a polarity of electric charges of the conductor and at a potential having a lower absolute value than an absolute value of a potential of the conductor.

In the painting operations performed by this painting apparatus, the charging unit charges the conductor. The insulator is charged when the conductor comes into contact with or proximity to the surface opposite to the painting target surface of the insulator. In this state, the paint mist is discharged from the discharge apparatus toward the painting target surface of the insulator. The paint mist is attracted to the painting target surface of the insulator to paint the painting target surface. As described above, in the structure in which the insulator is charged by bringing the charged conductor into contact with or proximity to the insulator, the variation in the distribution of electric charges on the painting target surface of the insulator can be reduced as compared with, for example, the structure in which the painting target surface is directly charged. Therefore, the painting target surface can be brought into a desired charged state. Thus, it is possible to obtain high painting quality. The paint mist discharged from the discharge apparatus is uncharged or is charged with the electric charges having the opposite polarity to the polarity of the electric charges of the conductor and at the potential having the lower absolute value than the absolute value of the potential of the conductor. Therefore, it is possible to suppress electrical repellence between particles of the paint mist due to the electric charges of the paint mist remaining on the insulator. As a result, it is possible to obtain a paint film having a sufficient film thickness. It is also possible to obtain high painting quality.

In the painting apparatus according to the present disclosure, the charging unit may be configured to continuously perform energization for charging the conductor while the discharge apparatus is discharging the paint mist toward the painting target surface of the insulator.

In the painting apparatus according to the present disclosure, the discharge apparatus may be grounded.

In this case, the painting apparatus for the insulator includes the discharge apparatus configured to discharge the uncharged paint mist. According to this case, it is not necessary to control energization for charging the discharge apparatus. Therefore, it is sufficient to control the energization of the conductor to charge the insulator. Thus, high painting quality can be obtained by bringing the painting target surface of the insulator into the desired charged state with relatively simple control.

In the painting apparatus according to the present disclosure, the discharge apparatus may be configured to be charged with the electric charges having the opposite polarity to the polarity of the electric charges of the conductor and at the potential having the lower absolute value than the absolute value of the potential of the conductor.

In this case, the painting apparatus for the insulator includes the discharge apparatus configured to discharge the paint mist charged with the electric charges having the opposite polarity to the polarity of the electric charges of the conductor and at the potential having the lower absolute value than the absolute value of the potential of the conductor. According to this case, it is possible to increase the potential difference between the insulator charged by the conductor and the paint mist discharged from the discharge apparatus. Therefore, the force for attracting the paint mist to the painting target surface can be increased. As a result, the paint mist can effectively be applied to the painting target surface of the insulator, thereby reducing a wasteful paint.

In the painting apparatus according to the present disclosure, the charging unit may be configured to stop the energization of the conductor after the discharge apparatus finishes discharging the paint mist toward the painting target surface of the insulator, and the charging unit may include a neutralization unit configured to switch the conductor between a grounded state and an insulated state.

In this case, the conductor and the insulator are neutralized such that the neutralization unit switches the conductor to the grounded state after the discharge apparatus finishes discharging the paint mist toward the painting target surface of the insulator. Therefore, the conductor and the insulator can be neutralized quickly and reliably as compared with a case of performing the neutralization by grounding the charged insulator. It is possible to shorten the tact time of the steps for painting the painting target surface of the insulator.

In the painting apparatus according to the present disclosure, the neutralization unit may be arranged between the conductor and a ground, and the neutralization unit may include a neutralization pipe that is a non-conductive member, and an air pressure adjusting unit configured to adjust an air pressure in the neutralization pipe.

In this case, the electrical resistance of the ground path between the conductor and the ground can be adjusted by adjusting the air pressure in the neutralization pipe. Thus, it is possible to adjust a timing to cause vacuum discharge. As a result, it is possible to easily adjust a timing to neutralize the conductor and the insulator.

In the painting apparatus according to the present disclosure, the charging unit may be configured to neutralize the conductor and the insulator by stopping the energization of the conductor. In this case, the charging unit does not require the neutralization unit.

Since the special neutralization unit is not required, the structure of the painting apparatus can be simplified.

In the painting apparatus according to the present disclosure, the conductor may be supported by a non-conductive support member.

When the discharge apparatus discharges the paint mist toward the painting target surface of the insulator, the conductor is not grounded (is insulated). Therefore, the painting target surface of the insulator can be painted with the electric charges of the conductor maintained at a high level. That is, it is possible to maintain a large potential difference between the insulator and the paint mist. As a result, the force for attracting the paint mist to the painting target surface can be increased, thereby reducing a wasteful paint.

In the painting apparatus according to the present disclosure, the conductor may be a jig configured to support the insulator.

Since the conductor for charging the insulator also has a function of the jig configured to support the insulator, the jig need not be provided separately. Thus, the structure of the painting apparatus can be simplified.

In the present disclosure, the painting quality can be increased.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

An embodiment of the present disclosure will be described below with reference to the drawings. The present embodiment is directed to an exemplary case where a resin bumper of an automobile is painted by electrostatic painting. The resin bumper of the automobile is, for example, a front bumper and is an example of an insulator. The resin bumper is, for example, an injection-molded product of polypropylene. A painting target surface is the outer surface of the resin bumper that can be seen from the outside when the resin bumper is attached to the automobile. This painting target surface can be subjected to the electrostatic painting.

Figure 1:
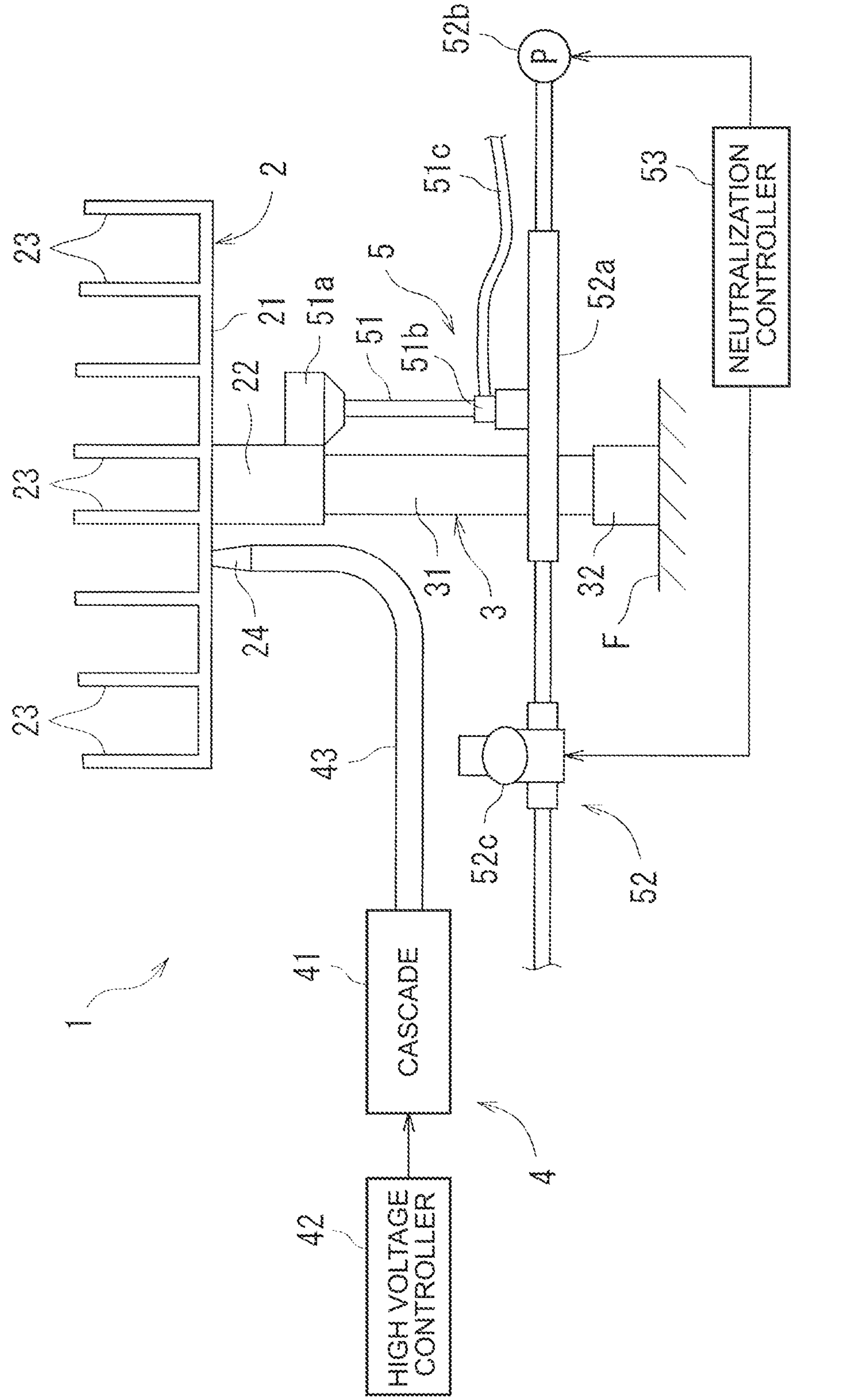
FIG. 1 is a diagram showing a schematic structure of a painting apparatus according to an embodiment.

FIG. 1 is a diagram showing a schematic structure of a painting apparatus 1 according to the present embodiment. As shown in FIG. 1, the painting apparatus 1 includes a conductor 2, a support 3, a charging unit 4, a neutralization unit 5, and a painting machine 6 (see FIG. 4). The painting machine 6 is an example of a discharge apparatus. Hereinafter, the components of the painting apparatus 1 will be described in detail.

Figure 3:
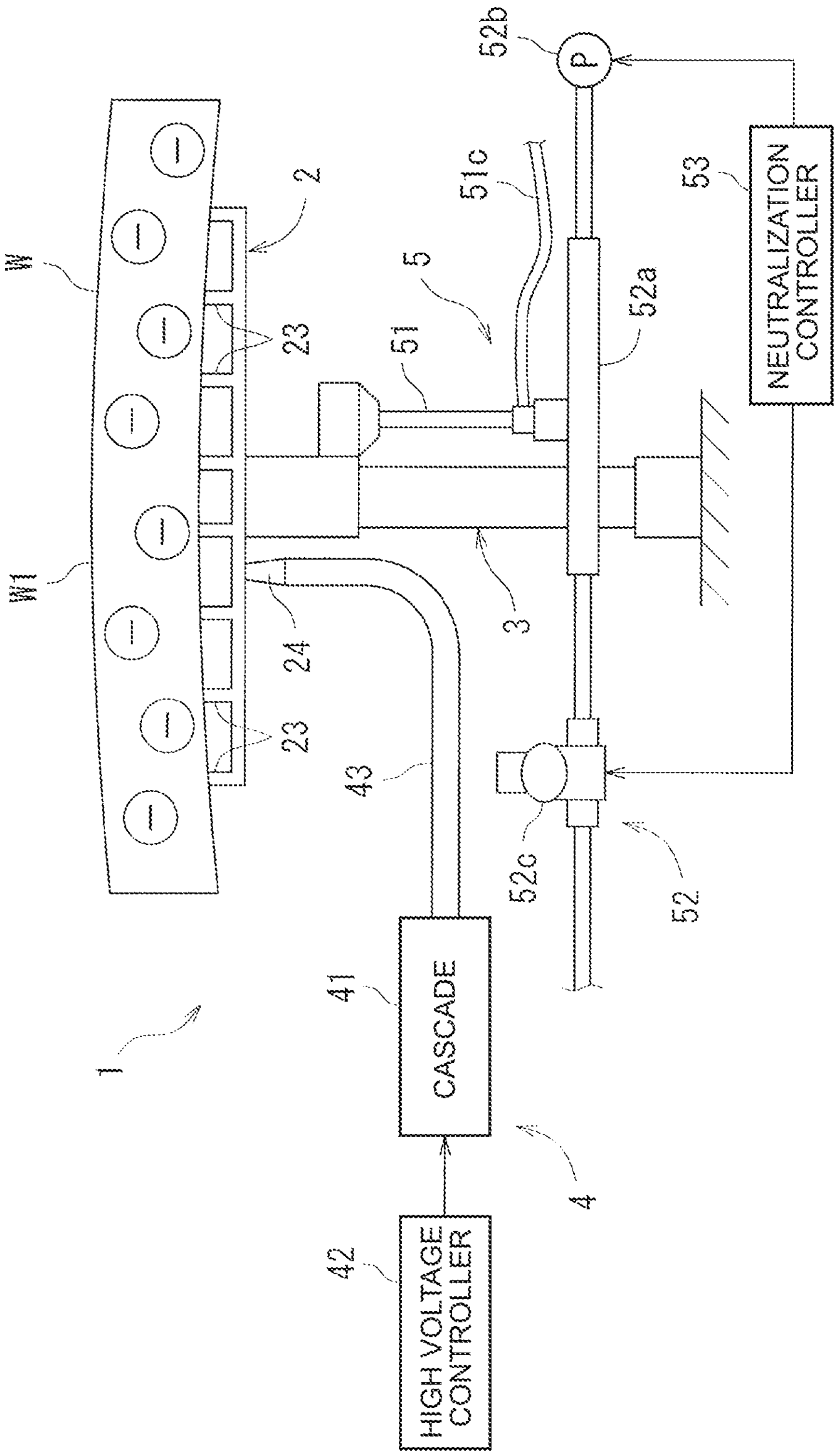
FIG. 3 is a diagram for describing a painting preparation step.

The conductor 2 supports a bumper W (see FIG. 3). The conductor 2 is a metal member having conductivity for negatively charging the bumper W by coming into contact with the back surface of the bumper W (a surface opposite to a painting target surface W1). The conductor 2 receives negative charges from the charging unit 4, and negatively charges the bumper W by giving the negative charges to the bumper W.

Specifically, the conductor 2 includes a base 21, a strut 22, a plurality of contacts 23, and a power receiver 24. The base 21 extends in a horizontal direction. The strut 22 is a columnar or prismatic portion extending downward from the center of the lower surface of the base 21. The contacts 23 are erected on the upper surface of the base 21. The power receiver 24 extends downward from a predetermined position on the lower surface of the base 21 (a position on a left side of the strut 22 in FIG. 1).

The height dimension of each contact 23 is set so that the upper end of each contact 23 comes into contact with the back surface of the bumper W when the bumper W is supported by the conductor 2 (see a state shown in FIG. 3). The structure of the contact 23 is not particularly limited to the above structure. In the present embodiment, the bumper W to be subjected to the electrostatic painting is curved to slightly bulge at a central portion in its longitudinal direction. The longitudinal direction of the bumper W corresponds to a vehicle width direction when the bumper W is mounted on a vehicle body. The central portion of the bumper W slightly bulges forward when the bumper W is mounted on the vehicle body. As shown in FIG. 3, the surface of the bumper W oriented upward when the bumper W is supported by the conductor 2 is the surface of the bumper W oriented forward when the bumper W is mounted on the vehicle body. The contacts 23 are arranged in the longitudinal direction of the bumper W, and the height dimension is set larger as the contact 23 is located closer to the center in the longitudinal direction. That is, the position of the upper end of the contact 23 is higher as the contact 23 is located closer to the center in the arrangement direction. When the bumper W is supported by the conductor 2, the upper end of each contact 23 comes into contact with the back surface (lower surface) of the bumper W. Each contact 23 may have an independent columnar shape, or the upper ends of the contacts 23 may be coupled into a frame shape. Although illustration is omitted in FIG. 1, a plurality of contacts 23 is provided in a direction orthogonal to the drawing sheet of FIG. 1 to stably support the bumper W.

In the state in which the conductor 2 supports the bumper W, the bumper W may be fixed to the conductor 2 by, for example, a fastener (not shown). In the state in which the conductor 2 supports the bumper W, the bumper W need not be fixed to the conductor 2. In this case, the bumper W may be supported by the conductor 2, for example, while being simply placed on the conductor 2.

Thus, the conductor 2 according to the present embodiment has both a function of negatively charging the bumper W and a function of supporting the bumper W as a jig.

The support 3 is a member for supporting the conductor 2. The support 3 includes a resin non-conductive strut 31 (an example of a non-conductive support member) and a metal base strut 32. The non-conductive strut 31 is connected to the lower end of the strut 22 of the conductor 2. The base strut 32 is connected to the lower end of the non-conductive strut 31. The base strut 32 is erected on a floor surface F (floor surface of a painting booth (not shown)). The conductor 2 is supported on the floor surface F by the support 3. That is, the conductor 2 is supported while being electrically insulated from the floor surface F because the support 3 includes the non-conductive strut 31. The structure for insulating the conductor 2 from the floor surface F is not limited to the above structure.

The charging unit 4 negatively charges the conductor 2 by energizing the conductor 2.

The charging unit 4 includes a cascade 41 serving as a high voltage generator, and a high voltage controller 42 configured to control the cascade 41.

The cascade 41 is connected to the power receiver 24 of the conductor 2 via a power line 43. The cascade 41 negatively charges the entire conductor 2 by applying a negative (minus) electrostatic high voltage to the conductor 2 via the power line 43 and the power receiver 24.

The high voltage controller 42 is connected to the cascade 41. The high voltage controller 42 controls the start and stop of output of the voltage (negative electrostatic high voltage) from the cascade 41. The high voltage controller 42 sets the voltage to be output from the cascade 41 to any value. The voltage to be output from the cascade 41 (potential for negatively charging the conductor 2) is not particularly limited, but may be set experimentally or empirically. In this case, the voltage to be output from the cascade 41 is preferably set to, for example, secure a large potential difference between a paint mist to be discharged from the painting machine 6 and the painting target surface W1 of the bumper W in the electrostatic painting described later, thereby sufficiently reducing a wasteful paint (overspray mist).

The neutralization unit 5 includes a neutralization pipe 51, an air pressure adjusting unit 52, and a neutralization controller 53.

The neutralization pipe 51 is a non-conductive member. Examples of the non-conductive member include a resin pipe. The upper end of the neutralization pipe 51 is closed by a metal upper conductor 51*a*. The upper conductor 51*a* is connected to the strut 22 of the conductor 2, and the upper conductor 51*a* and the strut 22 are electrically conductive. A metal ground pipe 51*b* is attached to a lower part of the neutralization pipe 51. A ground wire 51*c* is connected to the ground pipe 51*b*. The ground wire 51*c* is earthed (grounded).

The air pressure adjusting unit 52 includes an air pipe 52*a* extending in the horizontal direction. The lower end of the neutralization pipe 51 is connected to the air pipe 52*a*. The internal space of the air pipe 52*a* and the internal space of the neutralization pipe 51 communicate with each other.

A vacuum pump 52*b* is connected to one end (right end in FIG. 1) of the air pipe 52*a*. A vacuum regulator 52*c* is attached to the air pipe 52*a*. By operating the vacuum pump 52*b*, the internal space of the air pipe 52*a* and the internal space of the neutralization pipe 51 are evacuated. The pressures in these internal spaces are adjusted by the vacuum regulator 52*c*.

The neutralization controller 53 is connected to the vacuum pump 52*b* and the vacuum regulator 52*c*. The neutralization controller 53 controls ON/OFF of the vacuum pump 52*b* and controls the vacuum regulator 52*c* (control for adjusting the pressure in the internal space of the neutralization pipe 51). That is, in a state in which the conductor 2 is charged, the vacuum pump 52*b* is operated based on a control signal from the neutralization controller 53. Further, the vacuum regulator 52*c* is controlled based on a control signal from the neutralization controller 53. By this control, the pressure in the internal space of the neutralization pipe 51 is adjusted. When the pressure in the internal space of the neutralization pipe 51 reaches a predetermined pressure or lower (when the amount of air in the internal space of the neutralization pipe 51 reaches a predetermined amount or less), vacuum discharge occurs in the neutralization pipe 51. When the vacuum discharge occurs, electricity can pass through a ground path from the conductor 2 to the ground wire 51*c*. As a result, the electric charges of the conductor 2 are grounded via the ground wire 51*c*.

Figure 4:
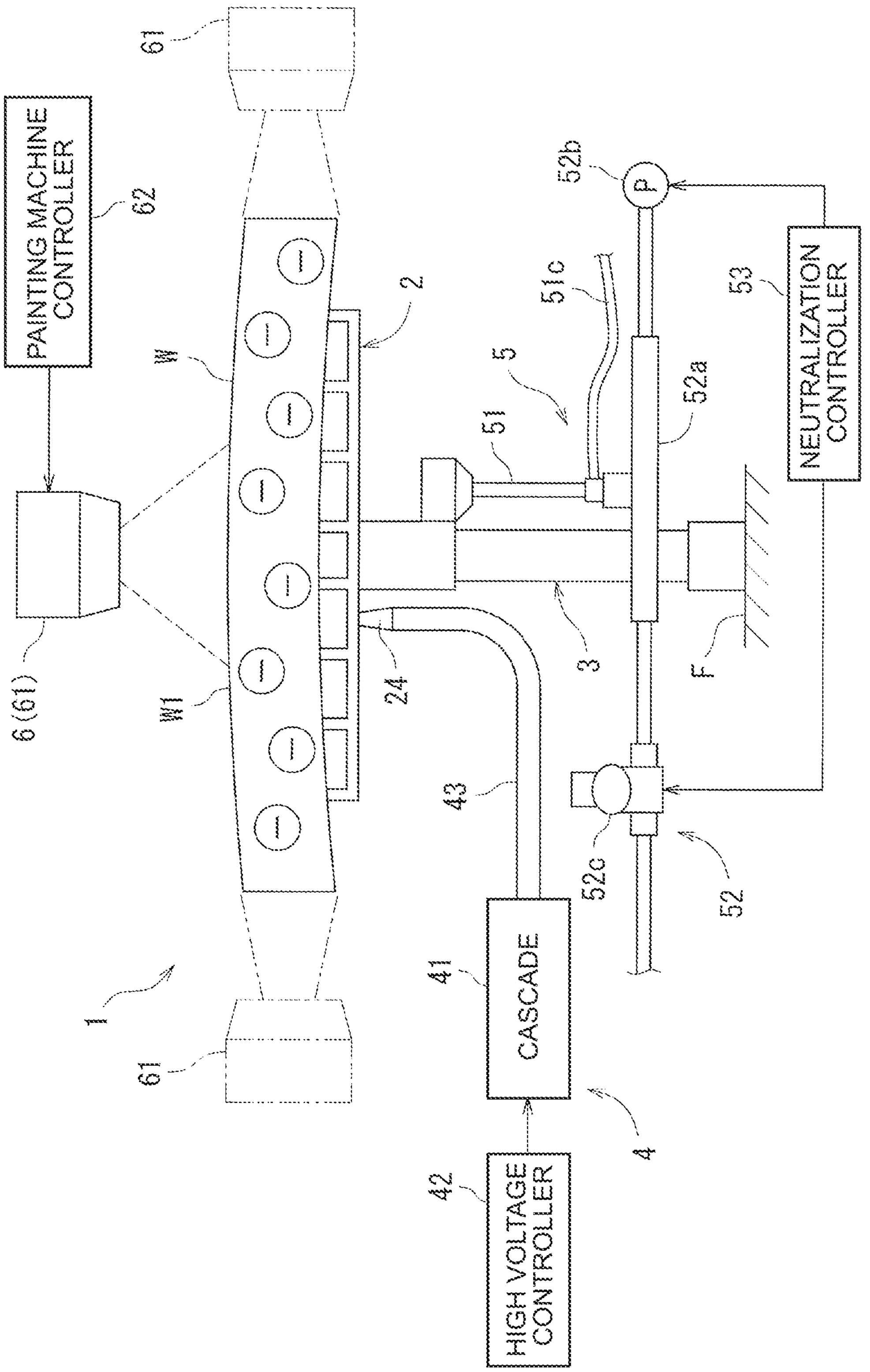
FIG. 4 is a diagram for describing a painting step.

As shown in FIG. 4, the painting machine 6 includes a spray gun 61, an articulated robot (not shown), and a painting machine controller 62. The spray gun 61 forms particles of (atomizes) a paint to generate a paint mist, and discharges the paint mist toward the painting target surface W1 of the bumper W. The articulated robot moves the spray gun 61. The controller 62 controls the operations of the spray gun 61 and the articulated robot.

Examples of the method for forming particles of the paint in the spray gun 61 include an air atomization method (air spray gun method), a hydraulic atomization method (airless spray gun method), and a rotary atomization method. The air atomization method uses air to form particles of the paint. The hydraulic atomization method uses a paint hydraulic pressure to form particles of the paint. The rotary atomization method uses a rotating atomization head to form particles of the paint. Although the air atomization method is adopted in the spray gun 61 of the painting machine 6 according to the present embodiment, another method may be adopted or a plurality of these methods may be combined.

The painting machine 6 is earthed (grounded). Therefore, the paint mist discharged from the spray gun 61 toward the painting target surface W1 of the bumper W is not charged. Examples of the structure for grounding the painting machine 6 include a structure in which a ground wire (not shown) is connected to the painting machine 6, and a structure in which the painting machine 6 is grounded via the articulated robot.

In the present embodiment, a water-based paint is used as the paint to be discharged from the painting machine 6. However, the type of the paint is not particularly limited. For example, a solvent-based paint may be used.

The painting machine controller 62 controls the operations of the spray gun 61 and the articulated robot in the electrostatic painting described later. The discharge of the paint mist from the spray gun 61 is controlled by the control of the painting machine controller 62. The painting machine controller 62 controls the operation of the articulated robot so that the discharge of the paint mist is directed to the painting target surface W1 of the bumper W. Specifically, the painting machine controller 62 stores, by offline teaching in advance, information for moving the spray gun 61 toward the painting target surface W1 of the bumper W to be painted. Examples of the information for moving the spray gun 61 include amounts of rotation angles of joints of the articulated robot. During the electrostatic painting after the offline teaching, the articulated robot operates based on the information in response to a control signal from the painting machine controller 62. As a result, the spray gun 61 faces a painting target portion, and the paint mist is discharged from the spray gun 61 to paint the painting target surface W1 of the bumper W.

The controllers described above (high voltage controller 42, neutralization controller 53, and painting machine controller 62) are connected by signal lines and can transmit and receive information to and from each other. In response to the transmission and reception of the signals, the controllers transmit command signals for the start and end of control to the respective devices (cascade 41, vacuum pump 52*b*, vacuum regulator 52*c*, spray gun 61, and articulated robot).

Figure 2:
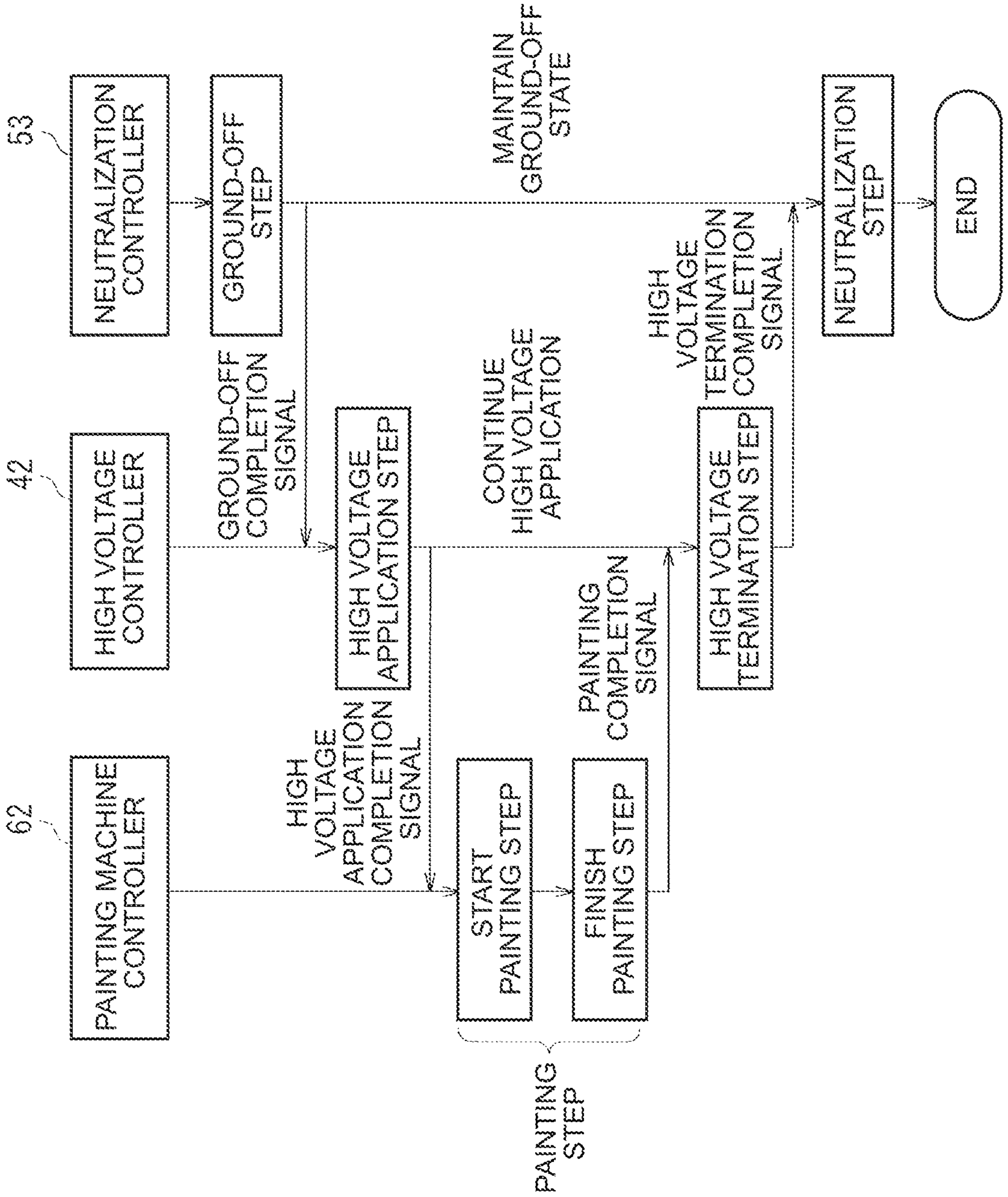
FIG. 2 is a sequence diagram for describing a procedure of a painting method according to the embodiment.

A procedure of a painting method to be performed by the painting apparatus 1 structured as described above will be described below. FIG. 2 is a sequence diagram for describing the procedure of the painting method.

As the procedure of the painting method according to the present embodiment, a painting preparation step, a painting step, a high voltage termination step, and a neutralization step are performed in this order as shown in FIG. 2. The painting preparation step includes a ground-off step and a high voltage application step. Hereinafter, the painting method according to the present embodiment will be described in detail.

As preprocesses for the electrostatic painting, a degreasing process, a cleaning process, and a drying process may be performed as in a case of general electrostatic painting. In the degreasing process, oil and fat adhering to the painting target surface W1 of the bumper W are decomposed. In the cleaning process, the oil and fat decomposed by the degreasing process and a degreasing solution are washed away. In the drying process, cleaning water used in the cleaning process is evaporated.

FIG. 3 is a diagram for describing the painting preparation step (ground-off step and high voltage application step).

In the ground-off step, the neutralization controller 53 of the neutralization unit 5 outputs a pump stop command signal to the vacuum pump 52*b* and a pressure adjustment stop command signal to the vacuum regulator 52*c*. Therefore, for example, the internal space of the air pipe 52*a* and the internal space of the neutralization pipe 51 are made open to the atmosphere. As a result, the internal space of the air pipe 52*a* and the internal space of the neutralization pipe 51 are set to a pressure equal to or higher than a predetermined value (a pressure at which vacuum discharge does not occur). The ground-off step may be performed with the bumper W (unpainted bumper W) placed on the conductor 2 or before the bumper W is placed on the conductor 2.

When the ground-off step is completed, a ground-off completion signal is output from the neutralization controller 53 to the high voltage controller 42. The high voltage application step is started when the high voltage controller 42 receives the ground-off completion signal. In the high voltage application step, a high voltage application command signal is output from the high voltage controller 42 to the cascade 41. Therefore, the cascade 41 applies a negative electrostatic high voltage to the conductor 2 via the power line 43 and the power receiver 24. As a result, the entire conductor 2 is negatively charged. The application of the negative electrostatic high voltage to the conductor 2 is continued until the high voltage controller 42 receives a painting completion signal output from the painting machine controller 62 as described later. That is, the application of the negative electrostatic high voltage to the conductor 2 is continued during the painting step.

When the entire conductor 2 is charged to a predetermined potential (negative potential) by the high voltage application step, a high voltage application completion signal is output from the high voltage controller 42 to the painting machine controller 62. The painting step is started when the painting machine controller 62 receives the high voltage application completion signal. In the painting step, a painting command signal is output from the painting machine controller 62 to the spray gun 61 and the articulated robot. Therefore, the discharge of the paint mist from the spray gun 61 is controlled. The operation of the articulated robot is controlled so that the discharge of the paint mist from the spray gun 61 is directed to the bumper W. FIG. 4 is a diagram for describing the painting step. The spray gun 61 represented by continuous lines in FIG. 4 is painting the upper surface of the bumper W (the front surface when the bumper W is mounted on the vehicle body). Each spray gun 61 represented by long dashed double-short dashed lines in FIG. 4 is painting the side surface of the bumper W (the side surface when the bumper W is mounted on the vehicle body).

In the painting step, the paint mist discharged from the spray gun 61 toward the painting target surface W1 of the bumper W is attracted to the painting target surface W1 of the bumper W to paint the painting target surface W1. At this time, the paint mist discharged from the spray gun 61 is charged with static electricity by approaching the painting target surface W1 of the charged bumper W. Therefore, the paint mist is applied to the painting target surface W1 by flying toward the conductor 2 and the painting target surface W1 along with the electrostatic attraction. The paint mist has a larger mass than that of airborne dust. Therefore, the electrostatic attraction acts on the paint mist more greatly than the airborne dust. As a result, the paint mist flies toward and is applied to the painting target surface W1 in preference to the airborne dust.

When the painting step is performed for a predetermined period and then finished, a painting completion signal is output from the painting machine controller 62 to the high voltage controller 42. The high voltage termination step is started when the high voltage controller 42 receives the painting completion signal. In the high voltage termination step, a high voltage application termination command signal is output from the high voltage controller 42 to the cascade 41. Therefore, the cascade 41 terminates the negative electrostatic high voltage applied to the conductor 2 via the power line 43 and the power receiver 24. In other words, the cascade 41 stops the supply of electric charges to the conductor 2. As a result, no negative charges are supplied to the conductor 2. Since the conductor 2 is supported while being insulated from the floor surface F as described above, the negative charges remain on the conductor 2.

Figure 5:
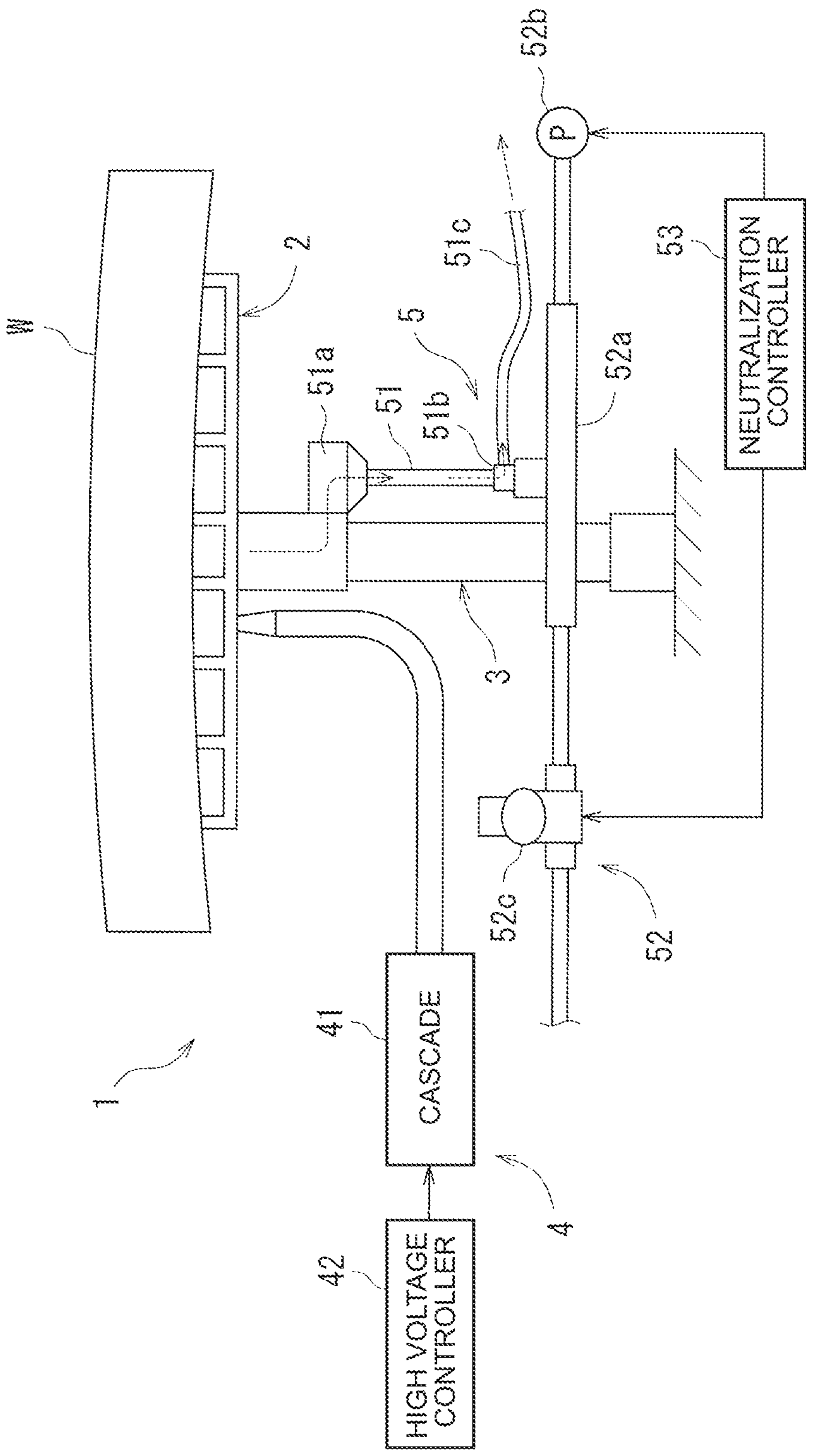
FIG. 5 is a diagram for describing a neutralization step.

When the supply of electric charges to the conductor 2 is stopped by the high voltage termination step, a high voltage termination completion signal is output from the high voltage controller 42 to the neutralization controller 53. The neutralization step is started when the neutralization controller 53 receives the high voltage termination completion signal. In the neutralization step, the neutralization controller 53 outputs a pump operation command signal to the vacuum pump 52*b* and a pressure adjustment command signal to the vacuum regulator 52*c*. Therefore, the vacuum pump 52*b* is operated. The pressure in the internal space of the neutralization pipe 51 is adjusted by the control on the vacuum regulator 52*c*. When the pressure in the internal space of the neutralization pipe 51 reaches the predetermined value or lower by the adjustment (when the amount of air in the internal space of the neutralization pipe 51 reaches the predetermined amount or less), vacuum discharge occurs in the neutralization pipe 51. When the vacuum discharge occurs, electricity can pass through the ground path from the conductor 2 to the ground wire 51*c*, and the electric charges of the conductor 2 are grounded via the ground wire 51*c*. FIG. 5 is a diagram for describing the neutralization step. When the vacuum discharge occurs as indicated by dashed arrows in FIG. 5, electricity can pass through the ground path from the conductor 2 to the ground wire 51*c* (conductor 2, upper conductor 51*a*, internal space of neutralization pipe 51, ground pipe 51*b*, and ground wire 51*c*) to ground the conductor 2.

By the neutralization step, the electric charges remaining on the conductor 2 and the bumper W are discharged to neutralize the conductor 2 and the bumper W. By performing the neutralization step using the vacuum discharge in the neutralization pipe 51, the conductor 2 and the bumper W are neutralized instantaneously.

By the above operations, formation of a single-layer paint film on the bumper W is completed.

The paint film of the bumper W may be a multilayer film. For example, when the paint film is a three-layer film including a base coat film, a color coat film, and a clear coat film, the base coat film is formed on the painting target surface W1. The color coat film is formed on the surface of the base coat film. The clear coat film is formed on the surface of the color coat film. The painting method to be performed by the painting apparatus 1 can be applied to the formation of any coat film out of the base coat film, the color coat film, and the clear coat film. When the painting method is applied to the formation of all the three coat films, a step of drying the paint is performed after the formation of one coat film, and then an operation of forming the next coat film is performed. That is, when forming the three-layer film, the procedure of the painting method described above is repeated three times.

When the above painting operations are completed, the bumper W is released from the conductor 2 by, for example, a transfer robot or an operator. The released bumper W is, for example, transported to a vehicle body assembling line and attached to the vehicle body.

In the present embodiment described above, the charged conductor 2 is brought into contact with the opposite side to the painting target surface W1 of the bumper W that is the insulator (the back surface of the bumper W). In this state, the paint mist is discharged from the spray gun 61 of the painting machine 6 toward the painting target surface W1 of the bumper W to paint the painting target surface W1 of the bumper W. Therefore, the variation in the distribution of electric charges on the painting target surface W1 of the bumper W can be reduced as compared with the case where the painting target surface W1 is directly charged (the technology of JP 10-76218 A). As a result, the painting target surface W1 can be brought into a desired charged state. For example, the entire bumper W can be charged uniformly. The charged state of the painting target surface W1 greatly affects the finish of painting in the electrostatic painting. Therefore, high painting quality can be obtained by bringing the painting target surface W1 into the desired charged state.

For example, when the insulator is painted by using a negatively charged paint mist, the electric charges of the paint mist applied to the painting target surface may remain on the insulator. When the next paint mist is discharged toward the painting target surface with the electric charges of the paint mist remaining, the electric charges remaining on the painting target surface electrically repel the electric charges of the next paint mist. When it is difficult to obtain a paint film having a sufficient film thickness due to the electrical repellence of these electric charges, it may be difficult to increase the painting quality. In the present embodiment, the paint mist is not charged by grounding the painting machine 6. Therefore, it is possible to reduce the occurrence of the electrical repellence of the electric charges, thereby obtaining a paint film having a sufficient film thickness. It is also possible to obtain high painting quality.

Although the insulator is positively charged in JP 10-76218 A, it is difficult to positively charge a resin material such as polypropylene. In the present embodiment, the insulator (bumper W) is negatively charged. Therefore, a wide variety of materials can be used as the insulator, thereby increasing the versatility.

The present embodiment does not require the step of coating the bumper W that is the insulator with a conductive material. Therefore, a special material or a special step for applying the conductive material is not required, thereby reducing the cost. When the conductive material contains a conductive pigment such as carbon in the case where the insulator is coated with the conductive material, there is a possibility that desired color development is not obtained in the electrostatic painting. Since the present embodiment does not require the step of applying the conductive material, desired color development can be obtained in the electrostatic painting. It is also possible to obtain high painting quality.

In the present embodiment, the painting step is performed with the conductor 2 energized by the charging unit 4. The painting step is also performed with the painting machine 6 grounded. In this case, it is not necessary to control the energization for charging the painting machine 6. That is, it is sufficient to control the energization of the conductor 2 to charge the bumper W. In other words, the control of the high voltage controller 42 may suffice. Therefore, high painting quality can be obtained by bringing the painting target surface W1 of the bumper W into a desired charged state with relatively simple control.

In the present embodiment, the energization of the conductor 2 is stopped after the painting step is finished, and the neutralization unit 5 is operated to ground the conductor 2, thereby neutralizing the conductor 2 and the bumper W. Therefore, the conductor 2 and the bumper W can be neutralized quickly and reliably as compared with, for example, a case of performing the neutralization by grounding the charged bumper. As a result, the tact time of the painting work including the steps described above can be shortened, thereby realizing an efficient painting method.

In the present embodiment, the conductor 2 is supported by the support 3 including the non-conductive strut 31. Therefore, in the painting step, the conductor 2 is not grounded (is insulated). As a result, the painting target surface W1 of the bumper W can be painted with the electric charges of the conductor 2 maintained at a high level. That is, it is possible to maintain a large potential difference between the bumper W and the paint mist. In this case, the force for attracting the paint mist to the painting target surface W1 (electrostatic attraction) can be increased. As a result, a wasteful paint can be reduced. Therefore, the amount of blown air from the spray gun 61 of the painting machine 6 toward the bumper W can be set to a relatively small value such as 400 NL/min (a general blown air amount is about 1000 NL/min). When the painting operation is controlled by the air pressure of the spray gun 61, the air pressure can be set to a relatively small value such as 0.02 MPa (a general air pressure is about 0.15 MPa). Even when the blown air amount and the value of the air pressure are reduced as described above, the majority of the paint mist discharged from the spray gun 61 can be applied to the bumper W. Thus, a wasteful paint can be reduced.

The present disclosure is not limited to the embodiment described above, and all modifications and applications included in the scope of claims and in a scope equivalent to the scope of claims may be made to the present disclosure.

For example, the embodiment described above is directed to the exemplary case where the resin bumper W of the automobile is painted by the electrostatic painting. The painting method and the painting apparatus for the insulator according to the present disclosure are not limited to this case, and may be applied to a case of painting any other insulator by the electrostatic painting. The size of the insulator applicable to the painting method and the painting apparatus for the insulator according to the present disclosure is not particularly limited. The painting method and the painting apparatus may be applied to a case of painting an insulator larger than the bumper W by the electrostatic painting or a case of painting an insulator smaller than the bumper W by the electrostatic painting. Only a part of the insulator (a desired part to be subjected to the electrostatic painting) may be charged by modifying the shape of the conductor 2. In this case, the part of the insulator can be charged uniformly, thereby obtaining high painting quality.

In the embodiment described above, the conductor 2 includes the contacts 23, and the bumper W is charged by bringing these contacts 23 into contact with the bumper W. The present disclosure is not limited to this case, and the bumper W may be charged by arranging the conductor 2 in proximity to the bumper W. In this case, the voltage to be output from the cascade 41 (potential for negatively charging the conductor 2) and the proximity distance of the conductor 2 to the bumper W are set as appropriate to obtain a sufficiently large potential of the bumper W. In this case, a jig for supporting the bumper W is provided separately. The jig in this case may have conductivity or not have conductivity.

In the embodiment described above, the paint mist is not charged by grounding the painting machine 6. In the present disclosure, the paint mist may positively be charged by positively charging the painting machine 6. That is, the paint mist may be charged with electric charges at an opposite polarity to that of the conductor 2. In this case, the potential difference between the bumper W and the paint mist can be increased as compared with, for example, the case of using the uncharged paint mist. Therefore, the force for attracting the paint mist to the painting target surface W1 can be increased. As a result, the paint mist can effectively be applied to the painting target surface W1 of the bumper W, thereby reducing a wasteful paint. Since the electrostatic particle forming effect can be obtained by charging the paint mist, it is possible to reduce the particle size of the paint mist. As a result, high painting quality can be obtained. In the present disclosure, the potential for charging the paint mist is a potential of electric charges at an opposite polarity to that of the conductor 2 with a lower absolute value than that of the conductor 2. With this potential, the electric charges of the paint mist applied to the painting target surface W1 of the bumper W are unlikely to remain on the painting target surface W1. This is because most of the electric charges of the paint mist are neutralized by a part of the electric charges on the painting target surface W1 of the bumper W. As a result, it is possible to reduce the occurrence of the electrical repellence between the painting target surface W1 and the paint mist discharged toward the painting target surface W1, thereby obtaining a paint film having a sufficient film thickness. It is also possible to obtain high painting quality. As an example of the charging potential of the conductor 2 and the charging potential of the paint mist, the charging potential of the conductor 2 is set to −20 kV, and the charging potential of the paint mist is set to +2 kV. The values of the charging potential of the conductor 2 and the charging potential of the paint mist are not limited to these values. It is preferable that the electric charges of the paint mist applied to the painting target surface W1 of the bumper W be made unlikely to remain on the painting target surface W1 by setting the absolute value of the potential for charging the paint mist to be sufficiently smaller than the absolute value of the potential for charging the conductor 2.

In the embodiment described above, the neutralization unit 5 utilizes the vacuum discharge to reduce the electrical resistance of the ground path for grounding the conductor 2. The structure for neutralizing the conductor 2 and the bumper W in the present disclosure is not particularly limited to the above, and a known variable electric resistor may be used as an example. As another example, a ground wire may be connected to the conductor 2 and an openable and closable switch may be arranged on the ground wire. In this case, the switch may be closed in the neutralization step to discharge the electric charges remaining on the conductor 2 and the bumper W.

In the present disclosure, the neutralization unit 5 is not an essential component. Instead of using the neutralization unit 5, the charging unit 4 may discharge the electric charges remaining on the conductor 2 and the bumper W (neutralize the conductor 2 and the bumper W) when the energization of the conductor 2 is stopped after the painting step is finished. In this case, the neutralization unit 5 is not required, thereby simplifying the structure of the painting apparatus 1. Examples of the structure for the neutralization by the charging unit 4 include a structure in which the electric charges remaining on the conductor 2 and the bumper W are grounded via the cascade 41.

In the embodiment described above, the conductor 2 and the bumper W are neutralized instantaneously by the neutralization step using the vacuum discharge caused in the neutralization pipe 51. The present disclosure is not limited to this case. In the neutralization step, the electrical resistance of the ground path for grounding the conductor 2 may gradually be reduced to slow down the movement of the electric charges, thereby stably performing the neutralization.

The present disclosure is applicable to a painting method and a painting apparatus for painting, by electrostatic painting, a painting target surface of a resin molded product such as a resin bumper of an automobile.

What is claimed is:

1. A painting apparatus for an insulator, the painting apparatus comprising:

a conductor configured to come into contact with or proximity to a surface opposite to a painting target surface of the insulator;

a charger configured to charge the conductor; and a paint discharger configured to discharge, toward the painting target surface of the insulator, a paint mist that is uncharged or is charged with electric charges having an opposite polarity to a polarity of electric charges of the conductor and at a potential having a lower absolute value than an absolute value of a potential of the conductor, wherein the charger is configured to continuously perform energization for charging the conductor while the paint discharger is discharging the paint mist toward the painting target surface of the insulator, wherein the charger is configured to stop the energization of the conductor after the paint discharger finishes discharging the paint mist toward the painting target surface of the insulator, and wherein the charger includes a neutralization unit configured to switch the conductor between a grounded state and an insulated state.

2. The painting apparatus according to claim 1, wherein the paint discharger is grounded.

3. The painting apparatus according to claim 1, wherein the paint discharger is configured to be charged with the electric charges having the opposite polarity to the polarity of the electric charges of the conductor and at the potential having the lower absolute value than the absolute value of the potential of the conductor.

4. The painting apparatus according to claim 1, wherein:

the neutralization unit is arranged between the conductor and a ground; and the neutralization unit includes a neutralization pipe that is a non-conductive member, and an air pressure adjusting unit configured to adjust an air pressure in the neutralization pipe.

5. The painting apparatus according to claim 1, wherein the charger is configured to neutralize the conductor and the insulator by stopping the energization of the conductor.

6. The painting apparatus according to claim 1, wherein the conductor is supported by a non-conductive support member.

7. The painting apparatus according to claim 1, wherein the conductor is a jig configured to support the insulator.

* * * * *